(12) United States Patent
Iizuka

(10) Patent No.: US 6,493,130 B2
(45) Date of Patent: Dec. 10, 2002

(54) LASER IMAGING DEVICE

(75) Inventor: Takashi Iizuka, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 10 days.

(21) Appl. No.: 09/769,436

(22) Filed: Jan. 26, 2001

(65) Prior Publication Data

US 2001/0010589 A1 Aug. 2, 2001

(30) Foreign Application Priority Data

Jan. 27, 2000 (JP) ........................................ 2000-018469

(51) Int. Cl.[7] .............................................. G02B 26/10
(52) U.S. Cl. ...................... 359/305; 359/201; 359/204
(58) Field of Search ............................... 359/305, 201, 359/204, 216, 618, 634, 583, 349

(56) References Cited

U.S. PATENT DOCUMENTS

| | | | | |
|---|---|---|---|---|
| 4,751,525 A | * | 6/1988 | Robinson | 346/108 |
| 5,325,381 A | * | 6/1994 | Paoli | 372/24 |
| 5,867,299 A | | 2/1999 | Takano et al. | |
| 5,877,885 A | | 3/1999 | Suda et al. | |
| 5,903,377 A | | 5/1999 | Takano et al. | |
| 5,903,378 A | | 5/1999 | Takano et al. | |
| 5,909,300 A | | 6/1999 | Araki et al. | |
| 5,969,347 A | | 10/1999 | Takano et al. | |

FOREIGN PATENT DOCUMENTS

JP 10142538 5/1998

* cited by examiner

*Primary Examiner*—Georgia Epps
*Assistant Examiner*—Richard Hanig
(74) *Attorney, Agent, or Firm*—Greenblum & Bernstein, P.L.C.

(57) ABSTRACT

A laser imaging device is provided with a laser source that emits a laser beam including a plurality of wavelength components. The wavelength components are divided by a dividing optical system, and at least two wavelength components are extracted and each of which is directed to a beam dividing element. Each wavelength component are divided into a plurality of beams, and independently modulated by the modulating optical systems. The beams having different wavelengths are directed to respective scanning optical system, and deflected thereby to scan in different areas on an objective surface.

13 Claims, 3 Drawing Sheets

LASER IMAGING DEVICE

BACKGROUND OF THE INVENTION

The present invention relates to a laser imaging device which deflects a plurality of laser beams having different wavelengths to scan on an objective surface to form an image thereon.

Conventionally, a laser imaging device such as a direct imager, a laser photo plotter or the like has been used for forming a circuit pattern on a base plate for manufacturing a printed circuit board, a semiconductor device or the like. Such an imaging device is constructed such that a laser beam emitted by a light source is modulated, and then deflected using a polygonal mirror. The deflected beam scans on an objective surface (i.e., the surface of a base plate), on which photosensitive material is applied, to form a circuit pattern thereon. Since the laser beam impinges on the objective surface directly, a gas laser (e.g., Argon laser), which oscillates continuously at high power is used as the light source.

Further, conventionally, in order to obtain a relatively high exposure amount, a laser source, which emits a laser beam having a plurality of wavelength components, has been employed. When such a beam is used, however, if a scanning optical system of the laser imaging device has chromatic aberration, beam spots to be formed on the objective surface are formed at different positions depending on the wavelengths. Therefore, in the scanning optical system of the laser imaging device employing such a light source, the optical systems thereof is constructed such that the chromatic aberration is compensated.

Recently, there is a requirement that a relatively wide area is scanned at a high speed. For example, Japanese patent provisional publication HEI 10-142538, entitled as "a laser imaging device having a multi-head scanning optical system" discloses a laser imaging device of such a type. In the laser imaging device described in the publication, two scanning optical systems, which are arranged in the main scanning direction, are provided. The laser beam having a single wavelength this modulated by a modulator, and the modulated beam is alternately directed to impinges on two scanning optical systems, which are arranged in the main scanning direction, so that a relatively wide area is exposed to light.

In the laser imaging device provided with two scanning optical systems as described above, if a light source, which emits a laser beam including a plurality of components having different wavelengths, is employed, it becomes necessary that the chromatic aberration of each scanning optical system is compensated, which complicates the structure of the scanning optical system as a whole, and increases the manufacturing cost.

SUMMARY OF THE INVENTION

It is therefore an object of the present invention to provide an improved laser imaging device provided with a laser source that emits a laser beam including a plurality of wavelength components, and a plurality of scanning optical systems arranged in the main scanning direction, and the structure of the optical systems will not be complicated.

For the above object, according to the invention, there is provided a laser imaging device, which is provided with at least one laser source that emits a laser beam including a plurality of wavelength components, at least one dividing optical system that spatially divides the laser beam into the plurality of wavelength components, at least two modulating optical systems, at least two of the plurality of wavelength components divided by the dividing optical system being modulated by at least two modulating optical systems, respectively, and at least two scanning optical systems. At least two of the plurality of wavelength components respectively modulated by the at least two modulating optical systems are caused to scan on at least two different areas of an objective surface by the at least two scanning optical systems.

With the above configuration, since the beams having different wavelengths are incident on different scanning optical systems, it is not necessary to compensate for the chromatic aberration.

Optionally, the at least one laser source includes a plurality of laser sources, and the at least one dividing optical system includes a plurality of dividing optical elements corresponding to the plurality of laser sources, respectively.

The laser imaging device is further provided with a beam combining system that combines beams having the same wavelength.

Further optionally, each of the at least two modulating optical systems includes an acousto-optical-modulator.

Still optionally, each of the at least two modulating optical system includes a beam dividing element that divides an incident beam into a plurality of divided beams.

In this case, each of the at least two modulating optical systems includes a multi-channel acousto-optical-modulator that modulates the plurality of divided beams independently from each other.

Still optionally, each of the at least two modulating optical systems is provided with a relay lens that adjusts a diameter of each of the wavelength components divided by the at least one dividing optical system, a collective lens that converges each of the plurality of divided beams divided by the beam dividing element on positions in the vicinity of the multi-channel acousto-optical-modulator, and a collimating lens that collimates the beams modulated by the multi-channel acousto-optical-modulator.

In particular case, each of the at least two scanning optical system may include a polygonal mirror that deflects the modulated beams to scan. In this case, each modulating optical system may include a piezo mirror, inclination of which is controlled to compensates for facet error of the polygonal mirror.

Further optionally, the at least one light source includes an Argon laser source that emits a laser beam including at least two components whose wavelengths are close, output power of the at least two components being substantially the same.

In the laser imaging device described above, the wavelengths of at least two components are approximately 351.1 nm and approximately 363.8 nm, so the wavelength-difference is small. Alternatively, at least two components may include a component whose wavelength range includes approximately 351.1 nm and approximately 351.3 nm, and another component whose wavelength is approximately 363.8 nm.

DESCRIPTION OF THE EMBODIMENTS

Hereinafter, referring to the accompanying drawings, laser imaging devices according to first and second embodiments of the invention will be described.

First Embodiment

Figure 1:
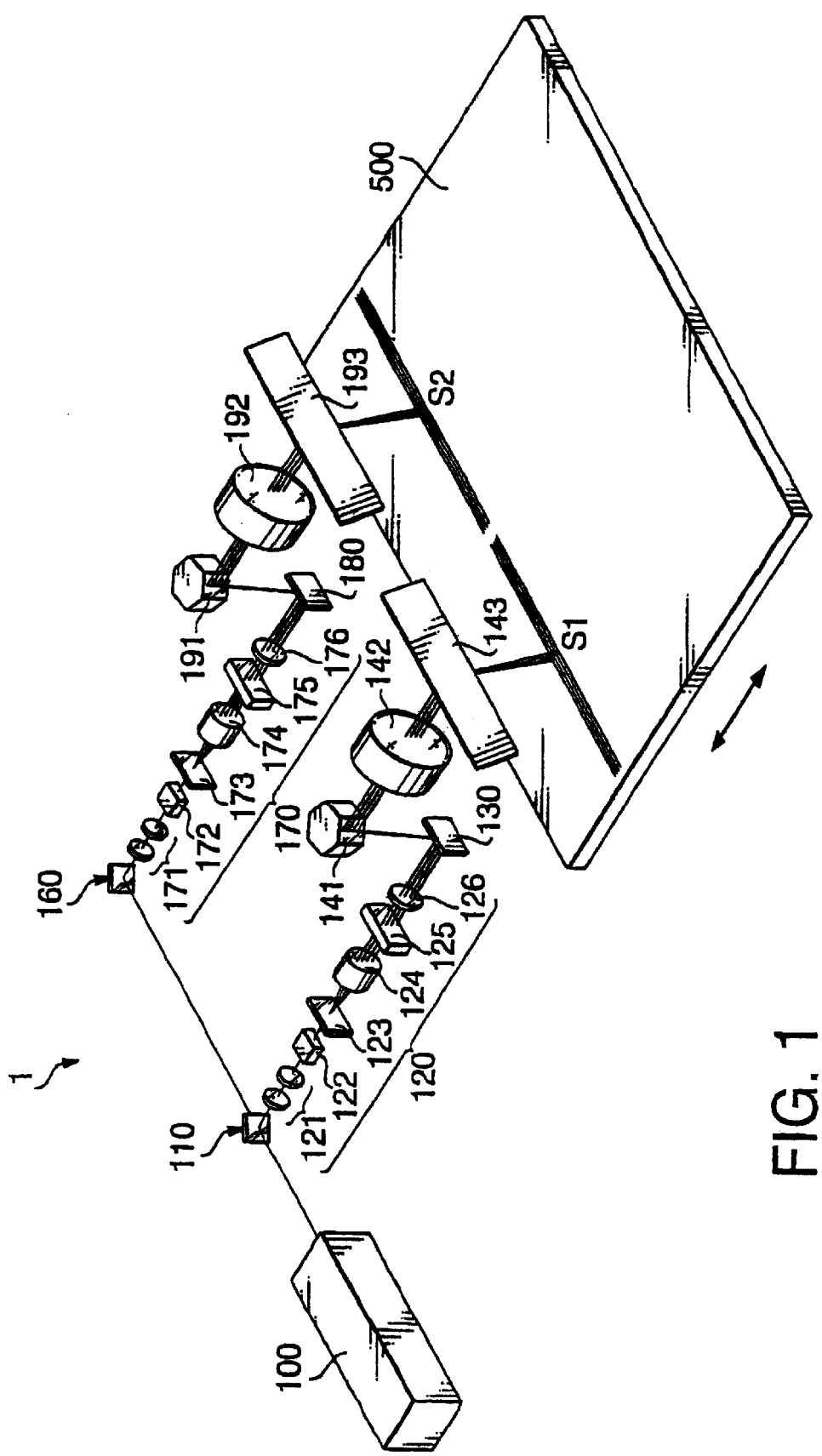
FIG. 1 schematically shows a perspective view of an arrangement of optical elements of a laser imaging device according to a first embodiment of the invention.

FIG. 1 schematically shows a perspective view of an arrangement of optical elements of a laser imaging device 1 according to a first embodiment of the invention.

The laser imaging device 1 is provided with:

an Argon laser source 100, which emits a laser beam including a plurality of components having different wavelengths;

a dichroic mirror 110 that transmits/reflects an incident beams depending on its wavelength;

first and second modulating optical systems 120 and 170 for modulating beams split by the dichroic mirror 110, respectively;

polygonal mirrors 141 and 191 that deflect the beams modulated by the first and second modulating optical systems 120 and 170, respectively; and fθ lenses 142 and 192 that converge the deflected beams on imaging areas S1 and S2 on a base plate 500, respectively.

The fθ lenses 142 and 192 are arranged such that optical axes of the fθ lenses 142 and 192 are included in a plane (not shown) perpendicular to rotation axes of the polygonal mirrors 141 and 191. In the description, a direction, within the plane, which is perpendicular to the optical axes of the fθ lenses 142 and 192, is referred to as a main scanning direction, and a direction perpendicular to the plane is referred to as an auxiliary scanning direction.

The Argon laser source 100 is provided with a dispersing element such as a prism, and arbitrary oscillation line(s) among a plurality of oscillation lines can be selectively resonance-amplified. The Argon laser source 100 according to the first embodiment emits first and second oscillation lines whose intensities are substantially the same, and whose wavelengths are close to each other. Specifically, the wavelength of the first oscillation line is approximately 351.1 nm (which is referred to as a first wavelength), and the wavelength of the second oscillation line is approximately 363.8 nm (which is referred to as a second wavelength).

It should be noted, however, that there exists an oscillation line of approximately 351.3 nm which is close to the oscillation line of approximately 351.1 nm. Therefore, in the embodiments described herein, the wavelength range including both the oscillation lines of approximately 351.1 nm and approximately 351.3 nm is referred to as the first wavelength. Since the difference between the wavelengths is small, similar imaging characteristics may be obtained with the beams.

The laser beam emitted by the Argon laser source 100 is split into the first beam having the first wavelength and the second beam having the second wavelength by the dichroic mirror 110. The first beam is reflected by the dichroic mirror 110, and is incident on the first modulating optical system 120. The second beam is transmitted through the dichroic mirror 110, is reflected by a beam bender 160, and is incident on the second modulating optical system 170.

The first modulating optical system 120 includes, from the beam incident side, a relay optical system 121 including a pair of positive lenses, a plezo mirror 122 that compensates for facet errors of the polygonal mirror 141, a diffractive beam splitting element 123, a collective lens 124, a multi-channel AOM (acousto-optical-modulator) 125, and a collimating lens 126.

The first beam reflected by the dichroic mirror 110 is incident on the relay optical system 121, which adjusts a diameter of the beam. The first beam passes through the piezo mirror 122, and impinges on the diffractive beam splitting element 123. The diffractive beam splitting element 123 is formed such that a plurality of minute zonal reference phase patterns are formed on one surface of a transparent parallel plate, and splits an incident beam into a plurality of beams by diffracting the beam. The plurality of beams are emitted from the diffractive beam splitting element 123 at different angles. In the laser imaging device 1 according to the first embodiment, a beam is divided into 16 beams by the diffractive beam splitting element 123. It should be noted that, in FIG. 1, only 4 beams are shown in order to simplify the drawing. The divided beams are emitted from the beam splitting element as arranged on a plane (i.e., the beams are arranged along a line).

In FIG. 1, the divided beams are arranged along the auxiliary scanning direction. By slightly inclining the line, on which the emitted beams are arranged, a distance between each beam in the auxiliary scanning direction can be reduced. Thus, by arranging the beams in such a manner, a pitch between scanning lines formed by the respective beams on the imaging surface can be made small.

The 16 beams divided by the diffractive beam splitting element 123 are incident on the collective lens 124. The collective lens 124 is a positive lens which directs the divided beams to respective channels of the multi-channel AOM (acousto-optical-modulator) 125.

Each beam is converged by the collective lens 124 and is incident on the multi-channel AOM 125, which is located at a rear focal point of the collective lens 124. The AOM is a crystal exhibiting an acousto-optical effect, which ON/OFF modulates a beam incident thereon in accordance with the ON/OFF status of a supersonic wave applied to the crystal. As the refractive index of the crystal periodically changes in accordance with the applied supersonic wave, the beam is diffracted. The diffracted beam or non-diffracted beam is used as a modulated beam. The multi-channel AOM 125 includes a plurality of channels which receive the beams divided by the diffractive beam splitting element 123, respectively. The plurality of channels of the multi-channel AOM 125 are controlled independently from each other. Thus, each of the plurality of beams can be ON/OFF modulated independently.

The modulated beams are collimated by the collimating lens 126, reflected by the beam bender 130, and are incident on the polygonal mirror 141. The 16 beams are deflected, by the polygonal mirror 141, simultaneously, to scan. The deflected beams (i.e., the scanning beams) are incident on the fθ lens 142, reflected by the mirror 143, and incident on an imaging area S1, where 16 beam spots, which move in the main scanning direction, are formed on the imaging area S1.

The second modulating optical system 170 includes, similarly to the first modulating optical system 120, a relay optical system 171 having a pair of positive lenses, a piezo mirror 172, a diffractive beam splitting element 173, a collective lens 174, a multichannel AOM 175, and a collimating lens 176.

The diameter of the second beam passed through the dichroic mirror 110 and reflected by the beam bender 160 is adjusted by the relay optical system 171 and is incident on the piezo mirror 172. The beam passed through the piezo mirror 172 is incident on the diffractive beam splitting element 173, where the beam is divided into 16 beams. The 16 beams are converged by the collective lens 174 and are incident on the multi-channel AOM 175, which is located at the rear focal point of the collective lens 174.

The modulated beams are collimated by the collimating lens 176, reflected by the beam bender 180, and are incident on the polygonal mirror 190. The beams are deflected by the polygonal mirror 190, pass through the fθ lens 192, are reflected by the mirror 193 and form beam spots on the second imaging area S2. The beam spots move on the second imaging area S2 in the main scanning direction.

It should be noted that the 16 scanning lines formed on the first imaging area S1 and another 16 scanning lines formed on the second imaging area S2 have the same pitch and are parallel to each other. The scanning lines extend in the main scanning direction.

Since the intensities of the beams forming the beam spots on the imaging areas S1 and S2 are adjusted by the modulating systems 120 and 170, the beam spots formed on the imaging areas S1 and S2 have substantially the same brightness. That is, each of the multichannel AOM 125 and 175 is capable of reducing the intensity of the beam at each channel Independently, and the multi-channel AOM's 125 and 175 are controlled such that, with reference to the beam having the least intensity, the intensity of the other beams are reduced. Thus, all the beams have even intensities.

The first and second imaging areas S1 and S2 of the base plate 500 are exposed to the scanning beam spots having the even intensities. It should be noted that the first and second beams include ultraviolet components. On the base plate 500, a photo-resistive layer, which is sensitive to the ultraviolet light, is formed.

The base plate 500 is fixedly placed on a table (not shown) of the laser imaging device 1. The table is mounted on a pair of rails placed on a base so that the table is movable along the rails in the auxiliary scanning direction (indicated by arrow in FIG. 1) by a driving device (not shown). The table moves in the auxiliary scanning direction at every scanning such that the pitch between the simultaneously formed 16 scanning lines and a pitch between the 16th line of a previous scanning and a first line of the succeeding scanning coincide with each other. It should be noted that the above-described structure for moving the base plate in the auxiliary scanning direction is well known, and therefore, the table, the rails and the driving device are not shown in FIG. 1. A person skilled in the field can easily configure such a structure for moving the base plate 500 in the auxiliary scanning direction synchronously with the main scanning.

As above, according to the laser imaging device 1, a laser beam including two wavelength components is divided into each component, and for each of the divided components, a modulating optical system and a scanning optical system are provided. With this configuration, since the beam including two wavelength components is not incident on a single optical system, it is unnecessary to compensate for chromatic aberration. Further, by arranging the two scanning optical systems in the main scanning direction, a wider area can be exposed simultaneously. Therefore, imaging speed can be increased.

Second Embodiment

Figure 2:
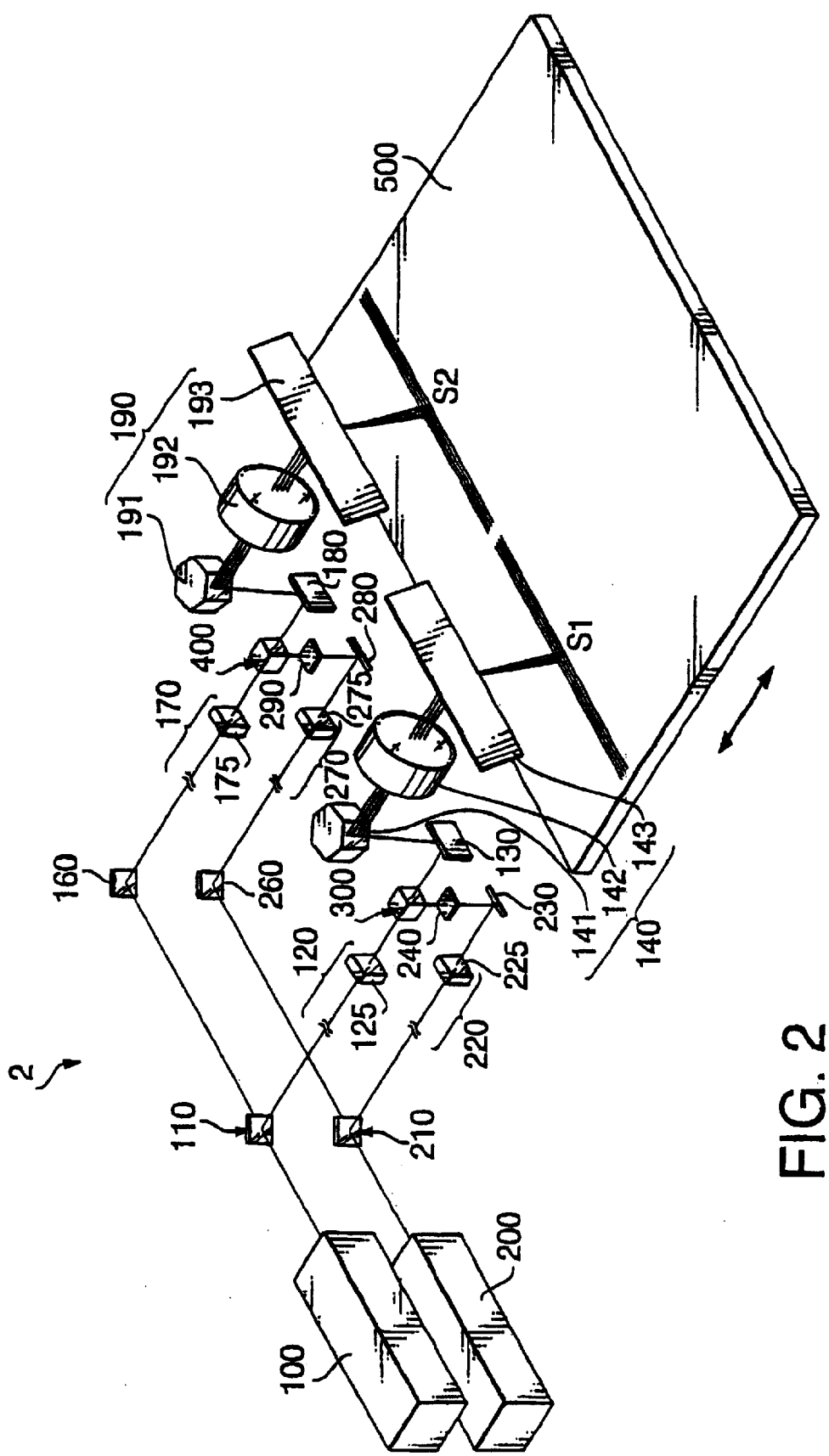
FIG. 2 schematically shows a perspective view of an arrangement of optical elements of a laser imaging device according to a second embodiment of the invention.
Figure 3:
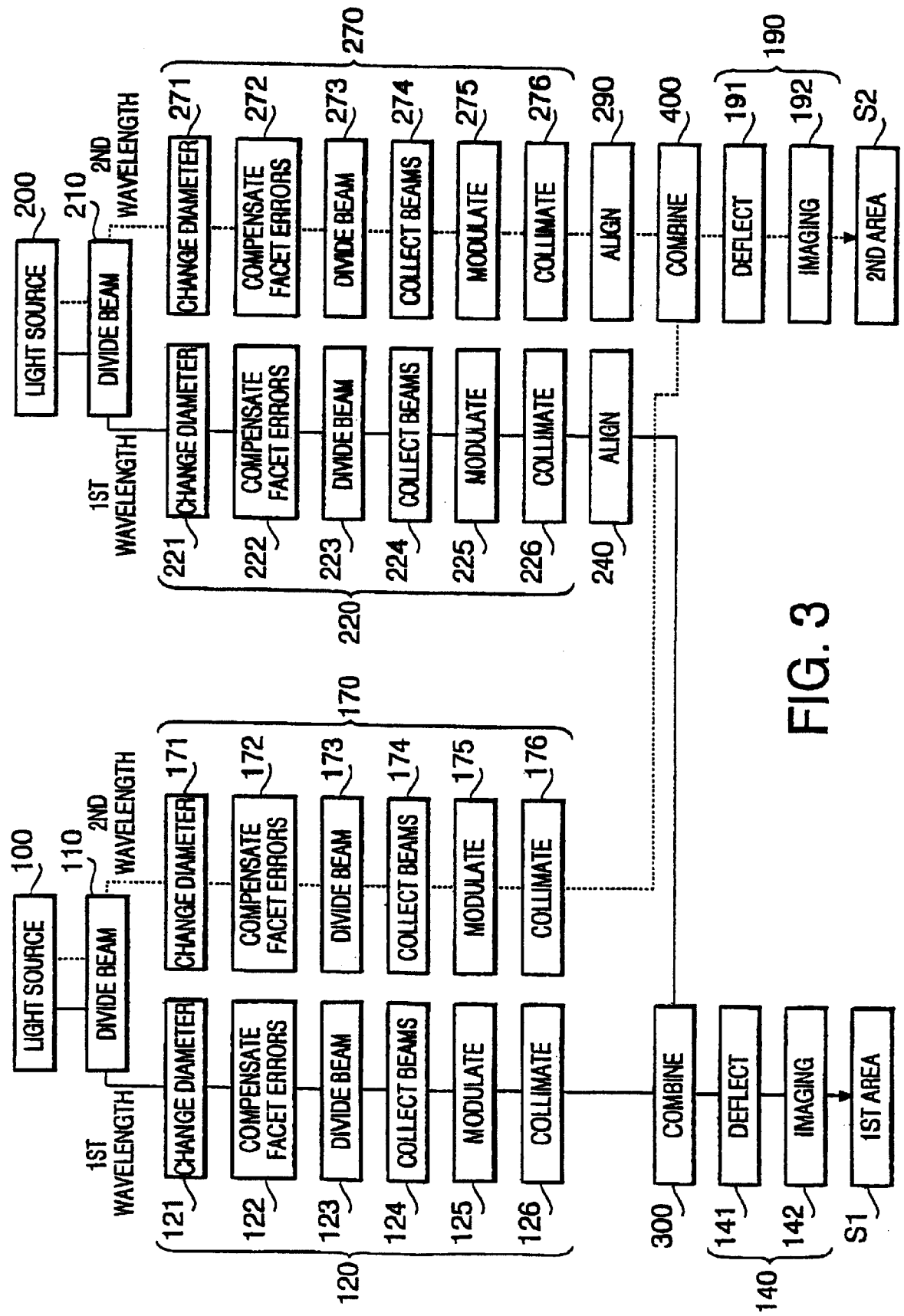
FIG. 3 is a diagram showing functions of optical elements of the laser imaging device shown in FIG. 2.

FIG. 2 shows a perspective view of optical elements of a laser imaging device 2 according to a second embodiment of the invention. FIG. 3 is a diagram showing functions of optical elements of the laser imaging device 2.

There is a tendency that the output power of the oscillation lines within an ultraviolet range is lower than the output power of oscillation lines in the visible range. In the second embodiment, in order to increase the amount of light, a pair of light sources are provided, and further, a pair of modulating optical systems are provided for each of the light sources.

That is, the laser imaging device 2 includes the structure similar to that of the laser imaging device 1, and further, an additional structure including another laser source and another pair of modulating optical systems for the additional laser source.

As shown in FIG. 2, the laser imaging device 2 includes Argon laser sources 100 and 200, each of which emits a laser beam including a first component having a first wavelength of approximately 363.8 nm and a second component having a second wavelength of approximately 351.1 nm. Dichroic mirrors 110 and 210 reflect/transmit the laser beams emitted by the Argon laser source 100 and 200, respectively, depending on the wavelengths of the components. The laser imaging device 2 is further provided with first through fourth modulating optical systems 120, 170, 220 and 270 respectively corresponding to the beams reflected by/transmitted through the dichroic mirrors 110 and 210. The laser imaging device 2 is further provided with a polarized beam combiner 300 that combines the beams modulated by the first and third modulating optical systems 120 and 220, and a polarized beam combiner 400 that combines the beams modulated by the second and fourth modulating optical systems 170 and 270. The beams combined by the polarized beam combiners 300 and 400 are deflected and converged to scan on the objective surface by imaging optical systems 140 and 190.

It should be noted that the second and fourth modulating optical systems 170 and 270 for modulating the beams, which have the second wavelength, function in substantially the same manner as the first and third modulating optical systems 120 and 220 formodulating the beam shaving the first wavelength. Accordingly, optical paths of the first beams will be described in detail hereinafter, and the optical path of the second beams will not be described in detail in the following description.

Further, it should also be noted that the first and third modulating optical systems 120 and 220 (and the second and fourth modulating optical systems 170 and 270) have substantially the same structure as the modulating optical systems 120 and 170 of the laser imaging device 1 according to the first embodiment, and accordingly some elements are not shown in FIG. 2.

The first and third modulating optical systems 120 and 220 include from the beam incident side, relay optical systems 121 and 221 each including a pair of positive lenses, piezo mirrors 122 and 222, diffractive beam splitting elements 123 and 223, collective lenses 124 and 224, multi-channel AOM's (acousto-optical-modulators) 125 and 225, and collimating lenses 126 and 226. It should be noted that the first and third modulating optical systems 120 and 220 (and the second and fourth modulating optical systems 170 and 270) have substantially the same structure as the modulating optical systems 120 and 170 of the laser imaging device 1 according to the first embodiment, and accordingly some elements are not shown in FIG. 2.

The beam having the first wavelength and emitted by the Argon laser source 100 is reflected by the dichroic mirror 110, and is incident on the relay optical system 121 of the first modulating optical system 120. The diameter of the laser beam is adjusted by the relay optical system 121. Then the beam passes through the piezo mirror 122, and impinges on the diffractive beam splitting element 123. The beam is divided into eight beams by the diffractive beam splitting element 123. The eight divided beams are converged by the collective lens 124, and are incident on the multi-channel AOM 125 located at the rear focal point of the collective lens 124, and modulated thereby. The modulated beams are collimated by the collimating lens 126, and are incident on the polarized beam combiner 300 as P polarized beams.

The beam having the first wavelength and emitted by the Argon laser source 200 is reflected by the dichroic mirror 210, and incident on the relay optical system 221 of the third modulating optical system 220. The diameter of the laser beam is adjusted by the relay optical system 221. Then the laser beam passes through the piezo mirror 222, and impinges on the diffractive beam splitting element 223. The beam is divided into eight beams by the diffractive beam splitting element 223. The eight divided beams are converged by the collective lens 224, and are incident on the multi-channel AOM 225 located at the rear focal point of the collective lens 224, and modulated thereby. The modulated beams are collimated by the collimating lens 226, reflected by a beam bender 230, and are incident on a half-wave plate 240. The laser source 100 is arranged such that the beam impinges on the polarized beam combiner 300 is a P polarized beam, and the laser source 200 is arranged similarly to the laser source 100. The beam emitted by the laser source 100 is incident on the beam combiner 300 as the P polarized beam as described above. The beam emitted by the laser source 200 is incident on the beam combiner 300 via the half-wave plate 240. By the half-wave plate 240, the polarized direction of the beam Is rotated (S polarized) with respect to the beam combiner 300, and therefore, the beam emitted by the laser source 200 is incident on the polarized beam combiner 300 as an S polarized beam.

The beam combiner 300 allows the P polarized beams directed from the first modulating optical system 120 to pass through, and reflects the S polarized beams directed from the third modulating optical system 170 so that the beams are combined. Specifically, in the laser imaging device 2, the eight beams from the first modulating optical system 120 and the eight beams from the third modulating optical system 220 are alternately arranged so that the resolution in the auxiliary scanning direction is increased. The combined beams (i.e., sixteen beams) are emerged from the beam combiner 300, which are reflected by a beam bender 130, and incident on the scanning optical system 140.

The 16 beams incident on the scanning optical system 140 are deflected by the polygonal mirror 141 simultaneously, and converged on the first imaging area S1 through the fθ lens 142 and the mirror 143. Thus, the sixteen scanning beam spots are formed on the first imaging area S1.

Similarly to the above, with respect to the second and fourth modulating optical systems 170 and 270, a laser beam having the second wavelength and emitted from the Argon laser source 100 is divided into eight beams, modulated by the multi-channel AOM 175, and directed to the polarized beam combiner 400. Further, a laser beam having the second wavelength and emitted from the Argon laser source 200 is also divided into eight beams, modulated by the multi-channel AOM 275, and incident on the polarized beam combiner 400 through a half-wave plate 290.

The beam combiner 400 allows the P polarized beams directed from the second modulating optical system 170 to pass through, and reflects the S polarized beams directed from the fourth modulating optical system 270 so that the beams are combined. Specifically, in the laser imaging device 2, the eight beams from the second modulating optical system 170 and the eight beams from the fourth modulating optical system 270 are alternately arranged so that the resolution in the auxiliary scanning direction is increased. The combined beams (i.e., 16 beams) are emerged from the beam combiner 400, which are reflected by a beam bender 180, and incident on the scanning optical system 190.

The 16 beams incident on the scanning optical system 190 are deflected by the polygonal mirror 161 simultaneously, and converged on the second imaging area S2 through the fθ lens 192 and the mirror 193. Thus, the sixteen scanning beam spots are formed on the second imaging area S2.

As described above, in the laser imaging device 2 according to the second embodiment, each of two laser beams emitted by the Argon laser sources 100 and 200 is divided into eight beams, and then, the divided beams are combined and the sixteen beams are obtained. Therefore, the intensity of each beam is approximately twice as large as that of the first embodiment.

Although two different laser sources are used, the beams having the same wavelength are extracted and combined, and the beams having the different wavelengths are not incident on the same optical system. Therefore, it is not necessary to compensate for the chromatic aberration.

The present disclosure relates to the subject matter contained in Japanese Patent Application No. 2000-018469, filed on Jan. 27, 2000, which is expressly incorporated herein by reference in its entirety.

What is claimed is:

1. A laser imaging device, comprising:
   at least one laser source that emits a laser beam including a plurality of wavelength components;
   at least one dividing optical system that spatially divides said laser beam into said plurality of wavelength components;
   at least two modulating optical systems, at least two of said plurality of wavelength components divided by said dividing optical system being modulated by said at least two modulating optical systems, respectively; and
   at least two scanning optical systems, at least two of said plurality of wavelength components respectively modulated by said at least two modulating optical systems being caused to scan on at least two different areas of an objective surface by said at least two scanning optical systems.

2. The laser imaging device according to claim 1, wherein said at least one laser source includes a plurality of laser sources, and wherein said at least one dividing optical system includes a plurality of dividing optical elements corresponding to said plurality of laser sources, respectively.

3. The laser imaging device according to claim 2, further comprising a beam combining system that combines beams having the same wavelength.

4. The laser imaging device according to claim 1, wherein each of said at least two modulating optical systems includes an acousto-optical-modulator.

5. The laser imaging device according to claim 1, wherein each of said at least two modulating optical system includes a beam dividing element that divides an incident beam into a plurality of divided beams.

6. The laser imaging device according to claim 5, wherein each of said at least two modulating optical systems includes a multi-channel acousto-optical-modulator that modulates the plurality of divided beams independently from each other.

7. The laser imaging device according to claim 6, wherein each of said at least two modulating optical systems includes:
   a relay lens that adjusts a diameter of each of said wavelength components divided by said at least one dividing optical system;

a collective lens that converges each of the plurality of divided beams divided by said beam dividing element on positions in the vicinity of said multi-channel acousto-optical-modulator; and a collimating lens that collimates the beams modulated by said multi-channel acousto-optical-modulator.

8. The laser imaging device according to claim 1, wherein each of said at least two scanning optical system includes a polygonal mirror that deflects the modulated beams to scan.

9. The laser imaging device according to claim 8, wherein each modulating optical system includes a piezo mirror, inclination of which is controlled to compensates for facet error of said polygonal mirror.

10. The laser imaging device according to claim 1, wherein said at least one light source includes an Argon laser source that emits a laser beam including at least two components whose wavelengths are close, output power of said at least two components being substantially the same.

11. The laser imaging device according to claim 10, wherein wavelengths of two components of said at least two components are approximately 351.1 nm and approximately 363.8 nm.

12. The laser imaging device according to claim 10, wherein said at least two components include a component whose wavelength range includes approximately 351.1 nm and approximately 351.3 nm, and another component whose wavelength is approximately 363.8 nm.

13. The laser imaging device according to claim 1, wherein said at least two scanning optical systems are located downstream of said at least one dividing optical system.

* * * * *